(12) United States Patent
Choi

(10) Patent No.: US 8,874,646 B2
(45) Date of Patent: Oct. 28, 2014

(54) MESSAGE MANAGING SYSTEM, MESSAGE MANAGING METHOD AND RECORDING MEDIUM STORING PROGRAM FOR THAT METHOD EXECUTION

(75) Inventor: Sung Wone Choi, Seoul (KR)

(73) Assignee: NHN Corporation, Seongnam-si (KR)

( * ) Notice: Subject to any disclaimer, the term of this patent is extended or adjusted under 35 U.S.C. 154(b) by 1044 days.

(21) Appl. No.: 11/817,055

(22) PCT Filed: Feb. 28, 2006

(86) PCT No.: PCT/KR2006/000703
§ 371 (c)(1),
(2), (4) Date: Aug. 24, 2007

(87) PCT Pub. No.: WO2006/091059
PCT Pub. Date: Aug. 31, 2006

(65) Prior Publication Data
US 2008/0168136 A1    Jul. 10, 2008

(30) Foreign Application Priority Data

Feb. 28, 2005   (KR) ................... 10-2005-0016413
Feb. 28, 2005   (KR) ................... 10-2005-0016419
Feb. 28, 2006   (WO) ............... PCT/KR2006/000703

(51) Int. Cl.
*G06F 15/16*         (2006.01)

(52) U.S. Cl.
USPC ........... 709/204; 709/203; 709/205; 709/223; 709/224; 709/206

(58) Field of Classification Search
USPC ......................................... 709/224; 370/229
See application file for complete search history.

(56) References Cited

U.S. PATENT DOCUMENTS 4,677,614 A * 6/1987 Circo .......................... 370/222
4,945,471 A * 7/1990 Neches ........................ 709/252
(Continued)

FOREIGN PATENT DOCUMENTS

EP         1452988 A1 *  9/2004
KR     1020010055738        7/2001
(Continued)

OTHER PUBLICATIONS http://telin.ugent.be/~df/papers/df21.pdf "Discrete-time queues with generally distributed service times and renewal-type server interruptions"—Sep. 2001 Fiems et al SMACS Research Group.*

(Continued)

*Primary Examiner* — Randy Scott
(74) *Attorney, Agent, or Firm* — Greer Burns & Crain Ltd.

(57) ABSTRACT

Disclosed are a message management system, a message management method, and a recording medium storing a program for executing the method. When message information transmitted by a user terminal through the Internet is managed, a message is transmitted through the user terminal, a contents node for storing message information is set for each user to store information, a priority of the contents nodes is set according to a generation time of the stored message, and a predetermined number of the contents nodes are deleted starting from the lowest node in the case of deletion timing. The stored message for the existing contents node is checked whether it is a message to be filtered. Address information of the highest node is checked and a predetermined number of the contents node is checked and a predetermined number of the contents nodes starting from the highest node are checked to check whether the stored message is a message to be filtered.

17 Claims, 17 Drawing Sheets

(56) References Cited

U.S. PATENT DOCUMENTS

| | | | | |
|---|---|---|---|---|
| 5,787,247 | A * | 7/1998 | Norin et al. | 709/220 |
| 6,560,632 | B1 * | 5/2003 | Chess et al. | 709/201 |
| 6,816,458 | B1 * | 11/2004 | Kroon | 370/235 |
| 7,081,823 | B2 * | 7/2006 | Gluhovsky et al. | 340/636.1 |
| 7,249,162 | B2 * | 7/2007 | Rounthwaite et al. | 709/206 |
| 2002/0073096 | A1 * | 6/2002 | Shaath et al. | 707/102 |
| 2004/0177120 | A1 * | 9/2004 | Kirsch | 709/206 |
| 2005/0101306 | A1 * | 5/2005 | Zabawskyj et al. | 455/414.1 |
| 2006/0010217 | A1 * | 1/2006 | Sood | 709/206 |
| 2006/0041502 | A1 * | 2/2006 | Blair et al. | 705/37 |
| 2006/0159123 | A1 * | 7/2006 | Fleury et al. | 370/468 |

FOREIGN PATENT DOCUMENTS

| | | |
|---|---|---|
| KR | 1020010082437 | 8/2001 |
| KR | 1020010109508 | 12/2001 |
| KR | 1020040076095 | 8/2004 |
| KR | 1020040077457 | 9/2004 |
| KR | 1020040096331 | 11/2004 |
| KR | 1020040110087 | 12/2004 |

OTHER PUBLICATIONS http://activemq.apache.org/how-can-i-support-priority-queues.html
"How Can I Support priority queues" Active MQ Apr. 2004.*

* cited by examiner

US 8,874,646 B2

MESSAGE MANAGING SYSTEM, MESSAGE MANAGING METHOD AND RECORDING MEDIUM STORING PROGRAM FOR THAT METHOD EXECUTION

This is a §371 of International Application No. PCT/KR2006/000703, filed Feb. 28, 2006.

BACKGROUND OF THE INVENTION (a) Field of the Invention

The present invention relates to a message managing system, a message managing method, and a recording medium storing a program for executing the method. More particularly, the present invention relates to a message managing system for managing message information transmitted from a user terminal through the Internet, a message managing method, and a recording medium storing a program for executing the method.

(b) Description of the Related Art

As the Internet has developed and the number of users has increased, it has become easier for the users to share or transmit/receive messages through the Internet and this message communication has become part of the users' daily life. The users can transmit and receive various types of messages through notes, chatting, a messenger, mail, and notice boards, and it has become a must to transmit and receive messages in the Internet community or during playing of online games.

Service providers generate contents nodes and store information on messages when receiving messages from the users. In this regard, the number of users who use message transmitting/receiving services has increased and so the number of messages transmitted by the respective users through the Internet has increased, and therefore the number of messages to be managed by the respective service providers has also quickly increased. Therefore, the respective service providers have attempted to increase system resources so as to maintain efficient message management.

However, the quality of service may be degraded as there is a limitation in increasing the system resources compared to the increases in the number of users and the usage rates of the message transmitting/receiving service by the individual users. In addition, as the Internet-based message transmitting/receiving methods have become diverse and more popular, the users have grown more sensitive to the quality of service.

Also, information on the messages transmitted by the users is used as marketing means in various manners within the range of respecting users' privacy.

Therefore, it is required to more efficiently store, use, and manage message information transmitted by various users in various formats.

As the usage rates for message posting or delivery services provided by Internet service providers have increased, cases of maliciously using the increases of usage rates have also increased, and hence, damages to general users and Internet service providers have also increased.

For example, obscene messages delivered to a plurality of unspecific users and other messages attempting to exchange hacked game money with the users' cash can be classified as messages giving damages to the users and the service providers (referred to as spam messages hereinafter.)

Accordingly, the respective service providers manage various policies for removing spam messages.

In general, on receiving a specific message from a specific user, the service provider stores the corresponding message in a memory, checks the message according to the transmission order, and filters a message when it is determined to be a spam message according to a predetermined spam policy.

However, it generates a load on the whole system as well as the memory to store all the messages transmitted by the respective users and to check them for the purpose of finding messages to be filtered.

Further, conventionally, specific users who transmit spam messages are pre-designated, and the messages transmitted by the corresponding users are determined to be those that will be filtered. However, in this case, there is no efficient solution when a new user appears who transmits spam messages.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to reduce system loads and to efficiently check or use messages that are transmitted through the Internet according to a predetermined policy.

The present invention has also been made in an effort to efficiently finding messages to be filtered without storing or checking all the messages that are transmitted by the users in consideration of limited memory resources and system resources.

The present invention has also been made in an effort to efficiently find spam message sending users without predefining them.

In one aspect of the present invention, in a message management system for managing message information transmitted by a user terminal through the Internet, the message management system includes: a node setting/modifying unit for setting contents nodes for a user, storing message information, and setting a priority of the contents nodes according to an order of message generation, when receiving the message from the user; a timing sensor for sensing deletion timing; a highest/lowest node checker for checking address information of the highest node for storing the most recently generated message information or address information of the lowest node for storing message information that is the oldest generated; a counter for counting a number of contents nodes; and a node checker for checking a message stored in the existing contents node, wherein the node setting/modifying unit deletes a predetermined number of the contents nodes starting from the lowest node by using information transmitted by the highest/lowest node checker and the counter, when receiving a deletion timing signal from the timing sensor.

In another aspect of the present invention, in a message management system for managing message information transmitted by a user terminal through the Internet, the message management system includes: a node setting/modifying unit for setting contents nodes for a user, storing message information, and setting a priority of the contents nodes according to an order of message generation, when receiving a message from the user; a highest/lowest node checker for checking address information of the highest node for storing the most recently generated message information or address information of the lowest node for storing message information that is the oldest generated; a counter for counting a number of contents nodes; and a node checker for checking a message stored in a predetermined number of the contents nodes starting from the highest node by using information transmitted by the highest/lowest node checker and the counter.

In still another aspect of the present invention, in a message management system for managing message information transmitted by a user terminal through the Internet, the message management system includes: a node generator for generating a contents node for storing message information transmitted by a user when a new message is provided from the user and no corresponding contents node for the user is provided; a node update unit for updating message information stored in the existing contents node when a new message is provided from the user and a corresponding contents node for the user is provided; a connection setter for setting connection states between contents nodes according to a message generation time stored by the contents node; and a controller for controlling the node generator to generate a new contents node when no corresponding contents node for a user is provided and controlling the node update unit to update the existing contents node when a corresponding contents node for the user is provided, when receiving a message from the user, and setting the newly generated contents node or updated contents node as a node for storing message information that is the most recently generated by the connection setter to be the highest node.

In still another aspect of the present invention, in a method for managing message information transmitted by a user terminal through the Internet, the message management method includes: a) setting contents nodes for storing message information for respective users to store information when receiving a message through the user terminal, and setting a priority of the contents nodes according to a generation time of the stored message; b) eliminating a predetermined number of the contents nodes starting from the lowest node in the case of deletion timing; and c) checking whether the stored message is a message to be filtered with respect to the contents nodes given after b).

In still another aspect of the present invention, in a method for managing message information transmitted by a user terminal through the Internet, the message management method includes: a) setting contents nodes for storing message information for respective users to store information when receiving a message through the user terminal, and setting a priority of the contents nodes according to a generation time of the stored message; b) checking address information of the highest node; and c) checking whether the stored message is a message to be filtered by checking a predetermined number of the contents nodes starting from the highest node.

In still another aspect of the present invention, in a method for managing message information by a user terminal through the Internet, the message management method includes: a) checking whether a contents node for a first user is provided when receiving message information from the first user through the user terminal; b) generating a first contents node for storing message information on the first user when no contents node for the first user is provided; c) setting the first contents node as a contents node for storing the most recently generated message information to be the highest node with respect to other related contents nodes when another contents node is provided; and d) resetting at least one of the first contents node and the related contents nodes.

In still another aspect of the present invention, provided is a recording medium storing a program for executing the disclosed methods by a computer.

DETAILED DESCRIPTION OF THE EMBODIMENT

An exemplary embodiment of the present invention will hereinafter be described in detail with reference to the accompanying drawings.

Figure 1:
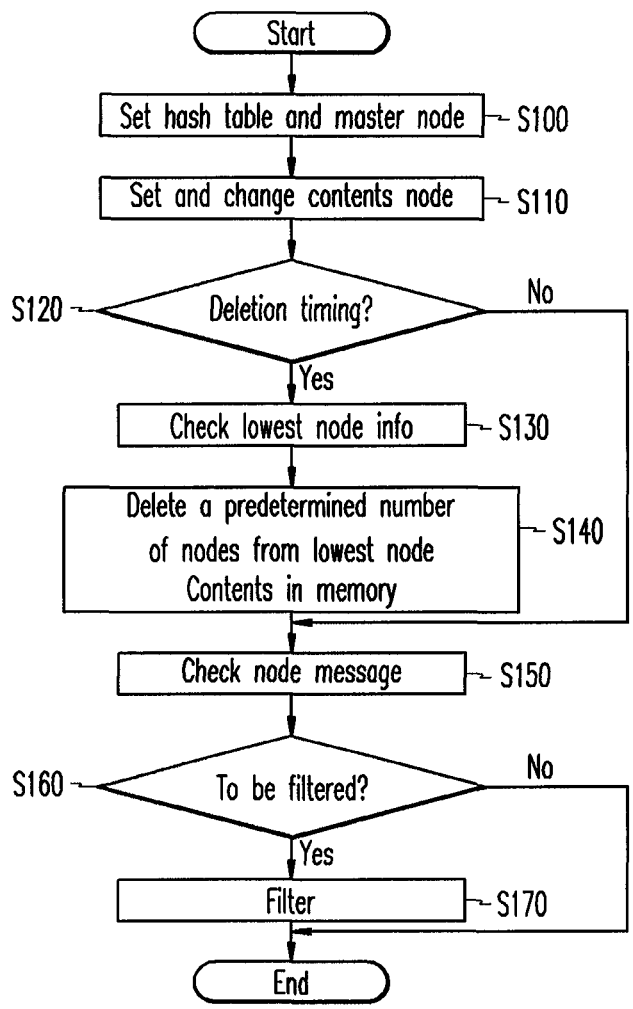
FIG. 1 to FIG. 3 show flowcharts for a message management method according to an embodiment of the present invention.

FIG. 1 shows a flowchart for a message management method according to an embodiment of the present invention.

A hash table for including address information of respective contents nodes for storing message information transmitted by a user is preset, and a master node for storing contents node information is also preset in step S100.

When a specific message is transmitted from a specific user, a contents node for storing message information is allocated. For example, the contents node can include information on a number of messages transmitted by the corresponding user, a time when the user sent the last message, actual message contents, a previous contents node address, and a next contents node address. The hash table stores address information of the corresponding contents node having a specific user ID as an input value in step S110. The contents nodes are allocated to the respective users according to the above-described method, and the respective contents nodes store message information transmitted by the corresponding users. The more recent the transmitted message information a contents node stores, the higher node the contents node is set to be.

In this instance, the master node stores information on a number of currently established contents nodes and information on the highest node address and the lowest node address. The messages stored in the contents node are processed by various filtering logics that can be established and are transmitted to the corresponding receiving user or are posted on a notice board on the Internet, either periodically or each time a message is transmitted from a user.

In this instance, a predetermined number of contents nodes in the memory can be deleted periodically or when contents nodes more than a predetermined number are established. That is, since the master node includes the number of current contents nodes and the lowest node address information and the respective contents nodes include previous node address information, a predetermined number of contents nodes starting from the lowest node, that is, the contents node which stores the message information that is the oldest generated can be deleted in steps S120, S130, and S140.

As a result, a predetermined number of contents nodes for storing message information that is generated late are deleted and an appropriate number of contents nodes are always provided in the memory, and messages of the contents nodes stored in the memory are checked whether they are spam messages in step S150. A message is filtered when it is determined to be a spam message in steps S160 and S170. In this instance, it is possible to classify the sender of the corresponding message as a spammer and control the messages subsequently transmitted by the same sender to be automatically filtered.

Figure 2:
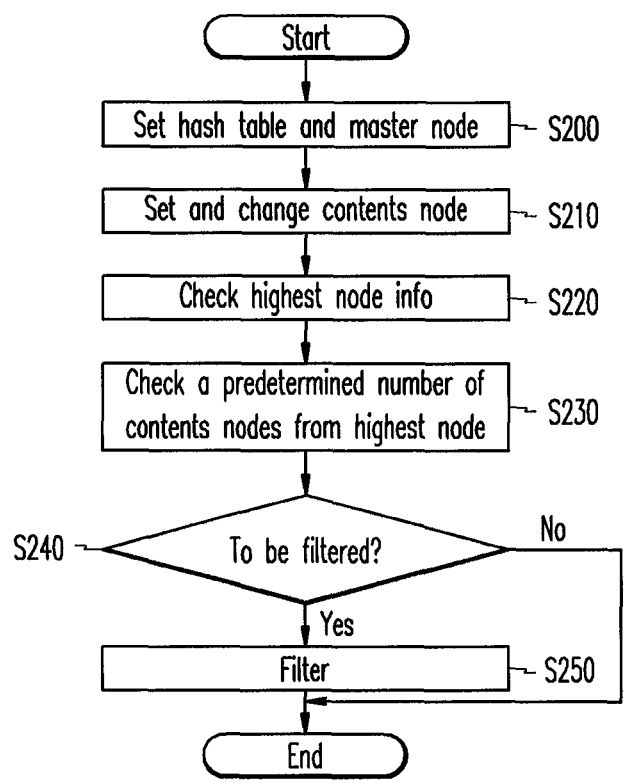

FIG. 2 shows a flowchart for a message management method according to another embodiment of the present invention.

A hash table for including address information of respective contents nodes for storing message information transmitted by a user is preset, and a master node for storing contents node information is preset in step S200.

When a specific message is transmitted from a specific user, a contents node for storing message information is allocated. For example, the contents node can include information on a number of messages transmitted by the corresponding user, a time when the user sent the last message, actual message contents, a previous contents node address, and a next contents node address. The hash table stores address information of the corresponding contents node having a specific user ID as an input value in step S210. The contents nodes are allocated to the respective users according to the above-described method, and the respective contents nodes store message information transmitted by the corresponding users. The more recent a transmitted message information a contents node stores, the higher node the contents node is set to be.

In this instance, the master node stores information on a number of currently established contents nodes and information on the highest node address and the lowest node address. The messages stored in the contents node are processed by various filtering logics that can be established and are transmitted to the corresponding receiving user or are posted on a notice board on the Internet, periodically or each time a message is transmitted from a user.

In this instance, it is possible to check whether a predetermined number of contents nodes starting from the highest node include spam messages. That is, since the master node includes the number of current contents nodes and the highest node address information including message information that is generated the most recently, and the respective contents nodes include subsequent node address information, system loads can be reduced by using the information and checking the contents nodes including the message information that is generated the most recently in steps S220 and S230.

The message is filtered according to various predefined spam processing policies when it is determined to be a spam message in steps S240 and S250. In this instance, it is possible to classify the sender of the message that is determined to be a spam message as a spammer and control the messages subsequently transmitted by the same sender to be automatically filtered. Concurrently, when contents nodes are established for longer than a predetermined period or more than a predetermined number, it is possible to delete a predetermined number of contents nodes starting from the lowest node in the memory by using the lowest node address information stored in the master node. In this instance, the total load given to the system including the memory can be further decreased.

Figure 3:
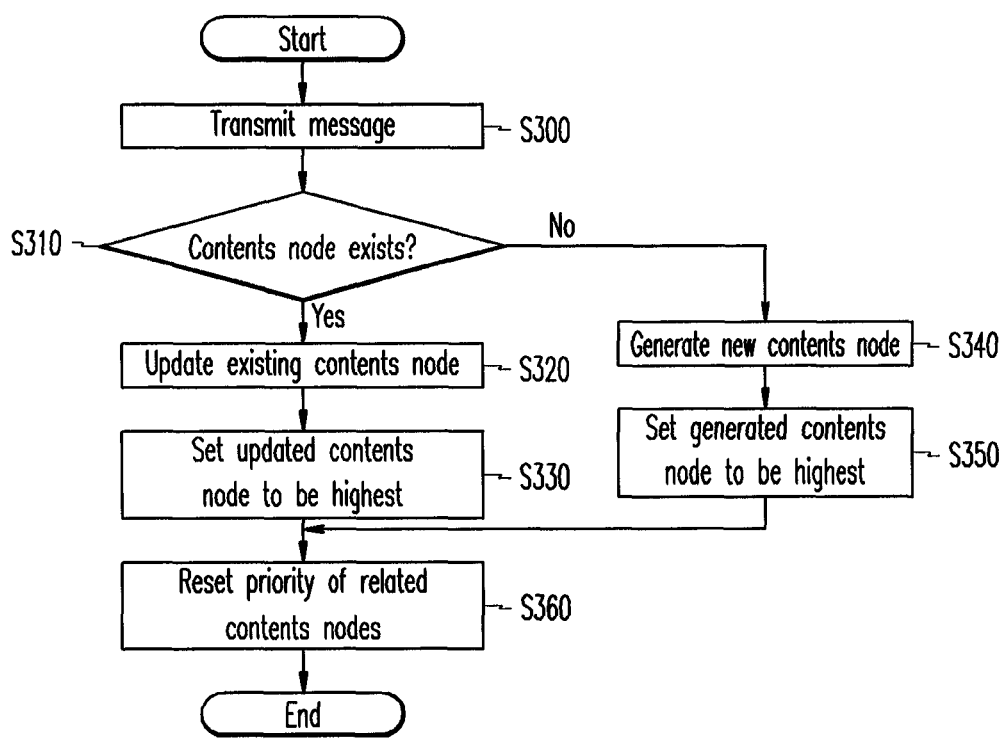

FIG. 3 shows a flowchart for a message management method according to an embodiment of the present invention, that is, a detailed flowchart of a method for setting the contents node or modifying the same.

When a message is transmitted from a user and no contents node for the user is provided, a new contents node for the user is allocated in the memory to store corresponding message information in steps S300, S320, and S340.

In this instance, the allocated node is a contents node for storing message information that is generated the most recently, and the same is established to be the highest node with respect to other contents nodes in step S350. The order of other existing contents nodes is reset with reference to the newly established highest node. Therefore, the existing highest node can be established to be a previous contents node for the newly established highest node.

When a message is transmitted from the user and a contents node established for the user is already stored in the memory, the existing contents node is updated, and no additional contents node is generated in steps S310 and S320.

For example, information including a number of messages that are stored in the contents node and are sent by the corresponding user, a time when the last message was transmitted, message contents, a previous contents node address, and a next address can be updated.

In this instance, the information such as the number of transmitted messages and the time when the last message was transmitted from among the information stored in the contents node are modified into new data, and message contents information can be updated such that new message contents are added as a string to the message contents information in addition to the existing message contents. It is obvious that the message contents information can also be updated in a like manner in which the existing message contents are modified into new message contents.

The updated node is a contents node for storing message information that is generated the most recently, and is established to be the highest node with respect to other existing contents nodes in step S130. In a like manner, the order of the other existing contents nodes is reset with reference to the newly established highest node. Therefore, the existing highest node is established to be a previous contents node for the newly updated highest node, the order of contents nodes is set according to the generation time of the messages, and the contents node storing the oldest message information is established to be the lowest node.

That is, the contents nodes are allocated to the respective users, existing contents nodes are updated without adding new contents nodes in the case of transmitting a new message, and the highest node is established as a contents node including message information that is generated the most recently.

Therefore, messages are efficiently managed and resources can be saved since the contents node storing the message information that is generated the most recently is established to be the highest node irrespective of newly generated contents node or updated contents node and the order of the respective contents nodes is established according to the message generation time.

Referring to FIG. 4 to FIG. 11, the process for setting the above-described master node and setting and deleting the contents node will be described in detail.

Figure 4:
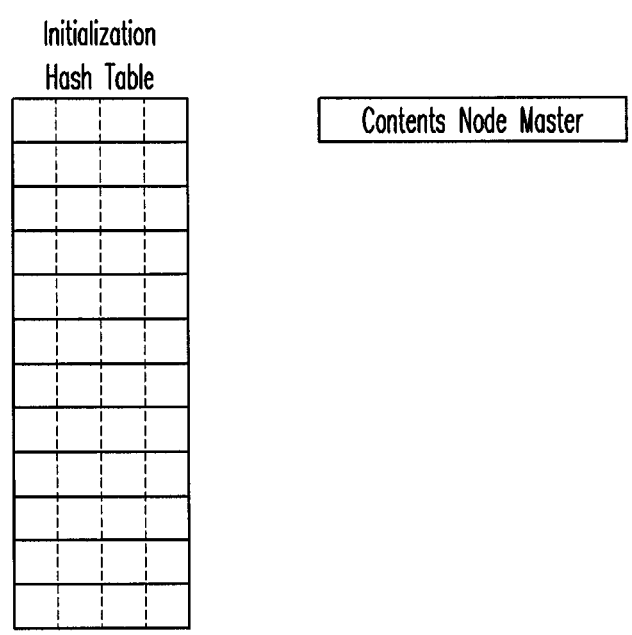
FIG. 4 to FIG. 11 show processes for setting and eliminating contents nodes for message management according to an embodiment of the present invention.

As shown in FIG. 4, a hash table for including address information on the contents node for storing message information transmitted by the user is preset with a predetermined size, and a master node for storing information on the contents node information is preset.

In this instance, the master node receives an allocated static address, and is not varied after the initial allocation. The master node can store address information on the highest node (a contents node that stores message information that is generated the most recently) and address information on the lowest node (a contents node that stores message information that is the oldest generated), and it can also store information on the total number of contents nodes provided in the memory.

The contents nodes are nodes for storing message information transmitted by the users and are established for the respective users. In detail, the contents node can include information on a number of messages transmitted by the corresponding user, a time when the user sent the last message, actual message contents, a previous contents node address, and a next contents node address.

The hash table stores address information of the corresponding contents node with a specific user ID as an input value.

In this instance, when a hash code is output through a hash function with a user ID as an input value and address information of the corresponding hash code is stored in the hash table, the existence of the corresponding contents node for the user and address information of the corresponding contents node are found. Therefore, it is possible to access the corresponding contents node based on the address information. In another case, when the hash code that is output through the hash function with the user ID as an input value has no corresponding address information, it can be determined that no corresponding contents node for the user is provided. In this instance, a new contents node can be allocated to the user, and address information of the contents node can be stored corresponding to the hash code.

Figure 5:
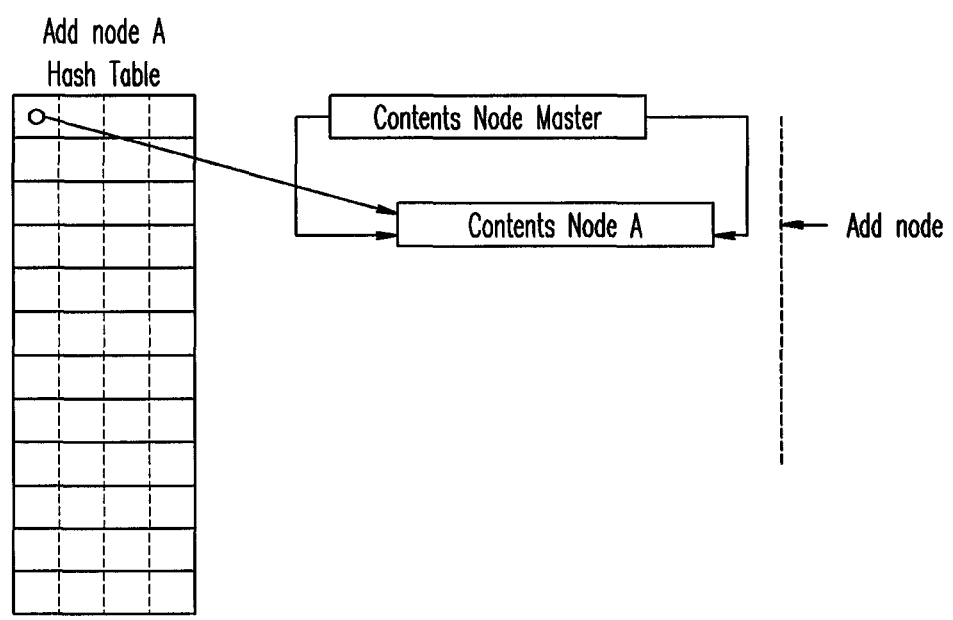

As shown in FIG. 5, when a message A is transmitted from a user A with the ID of A, a contents node A for storing information on the message A is generated, and the address information with the user ID A as an input value is stored in the hash table. The master node stores address information of the contents node A as the highest node address information and the lowest node address information.

For example, the master node stores address information of the contents node A as the highest node in the header (HEADER) and stores the address information of the contents node A as the lowest node in the tail (TAIL) to thereby add the contents node A. The contents node A can store master node address information in the header (HEADER) and a null (NULL) in the tail (TAIL) as the highest node and the lowest node.

Figure 6:
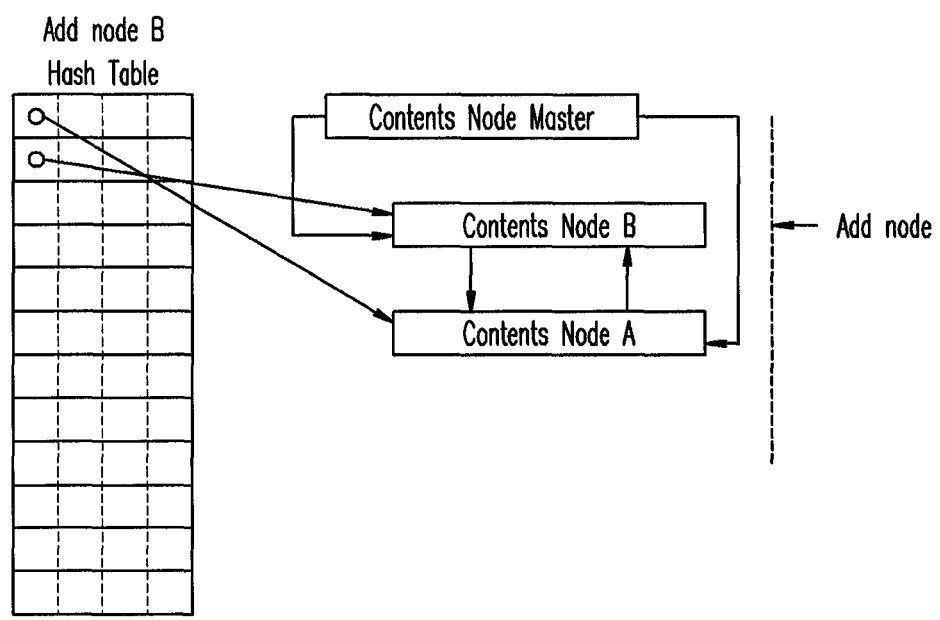

As shown in FIG. 6, when a message B is transmitted from a user B with the ID of B, a contents node B for storing information on the message B is generated, and the address information with the user ID B as an input value is stored in the hash table.

The master node stores address information of the contents node B as the highest node address information and it maintains the lowest node address information as the address of the contents node A. The contents node A and the contents node B respectively store previous contents node address information and next contents node address information.

For example, the master node stores address information of the contents node B as the highest contents node in the header (HEADER) and maintains the lowest node address information stored in the tail (TAIL) to be the address of the contents node A.

The contents node A can store contents node B address information as a next contents node address in the header (HEADER) and can store a null (NULL) in the tail (TAIL), and the contents node B can store contents node A address information as a previous contents node address in the tail (TAIL) and can store master node address information in the header (HEADER).

Figure 7:
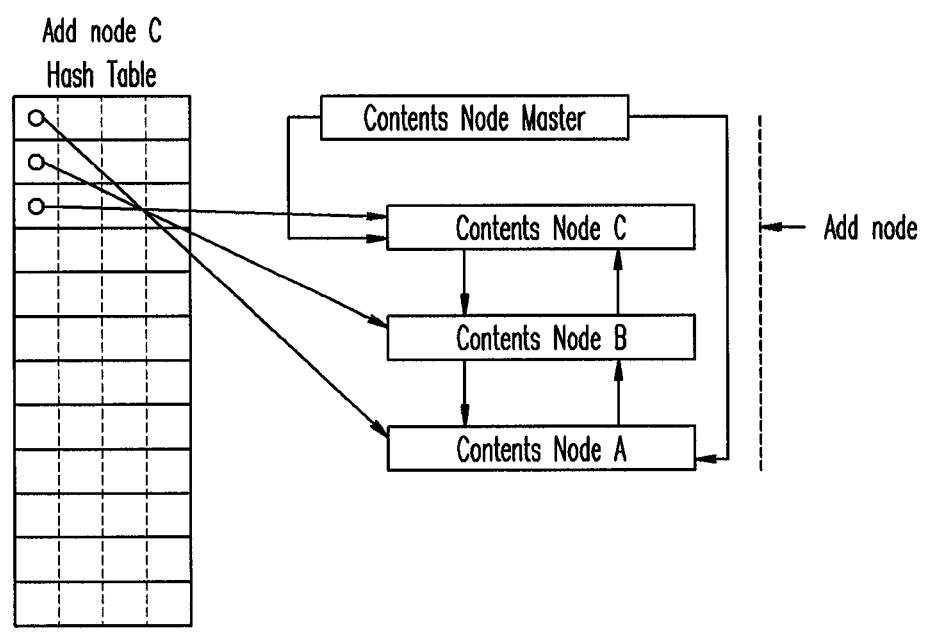

As shown in FIG. 7, when a message C is transmitted from a user C with the ID of C, a contents node C for storing information on the message C is generated, and the address information with the user ID C as an input value is stored in the hash table.

The master node stores address information of the contents node C as the highest node address information and it maintains the lowest node address information as the address of the contents node A. The contents node A, the contents node B, and the contents node C newly establish or modify previous node address information and next node address information and store them.

For example, the master node stores address information of the contents node C as the highest contents node in the header (HEADER) and maintains the lowest node address information stored in the tail (TAIL) to be the address of the contents node A.

The contents node A can store contents node B address information as a next contents node address in the header (HEADER) and can store a null (NULL) in the tail (TAIL), and the contents node B can store address information of the contents node C as a next contents node address in the header (HEADER) and can store contents node A address information as a previous contents node address in the tail (TAIL). The contents node C can store address information of the contents node B as a previous node address in the tail (TAIL), and can store master node address information in the header (HEADER).

In this instance, the contents node A, the contents node B, and the contents node C can store previous contents node address information or next contents node address information in one of the header and the tail and thereby store information on the connection between the contents nodes.

Figure 8:
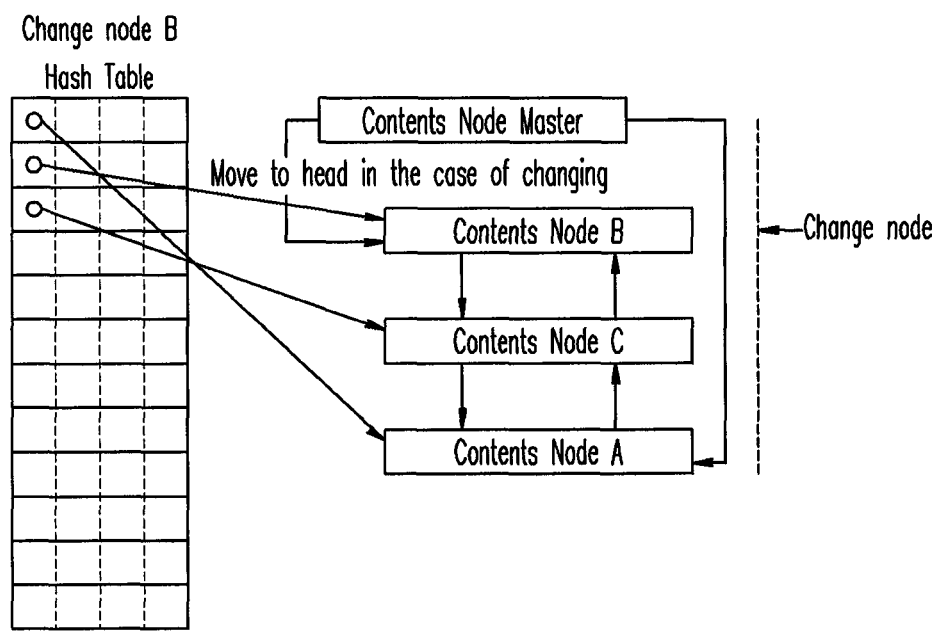

In this instance, as shown in FIG. 8, when a new message is transmitted from the user B, the already generated contents node B is updated and established to be the highest node. That is, information including the number of messages sent by the corresponding user, the time when the last message is transmitted, the message contents, the previous node address, and the next node address stored in the contents node B is updated, and highest node address information stored by the master node is changed.

In detail, the master node stores address information of the contents node B as the highest node, and it maintains the lowest node address information. The contents node A, the contents node B, and the contents node C respectively change and store the previous node address and the next node address information.

For example, the master node stores address information of the contents node B as the highest node address in the header (HEADER) and it maintains the lowest node address information stored in the tail (TAIL) to be an address of the contents node A.

The contents node A can store contents node C address information as a next node address in the header (HEADER) and can store a null (NULL) value in the tail (TAIL), the contents node C can store contents node B address information as a next node address in the header (HEADER) and can store contents node A address information in the tail (TAIL), and the contents node B can store contents node C address information as a previous node address in the tail (TAIL) and can store master node address information in the header (HEADER).

That is, since the contents nodes are selected for the respective users, when a new message is transmitted from a user having a generated contents node, relations between the respective contents nodes including the highest node are reset by updating the information stored by the master node and the existing contents node without addition of contents nodes.

Figure 9:
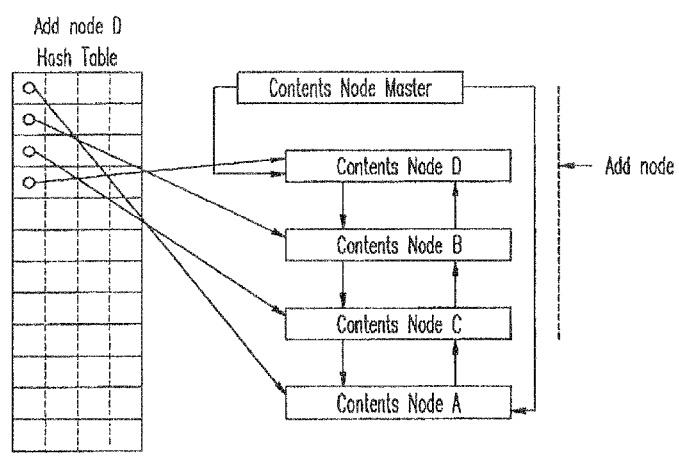

As shown in FIG. 9, when a message D is transmitted from a user D with the ID of D, a contents node D for storing message D information is generated, and corresponding address information with the user ID of D as an input value is stored in the hash table.

The master node stores address information of the contents node D as the highest node address information, and the contents node A, the contents node B, the contents node C, and the contents node D newly establish or modify previous contents node address information and next contents node address information and store them.

For example, the master node stores address information of the contents node D as the highest node address in the header (HEADER). The contents node A can store contents node C address information as a next contents node address in the header (HEADER) and can store a null (NULL) in the (TAIL), and the contents node C can store contents node B address information as a next contents node address in the header (HEADER) and can store contents A address information as a previous contents node address in the tail (TAIL). The contents node B can store contents node C address information as a previous node address in the tail (TAIL) and can store contents node D address information as a next node address in the header (HEADER), and the contents node D can store contents node B address information as a previous node address in the tail (TAIL) and can store master node address information in the header (HEADER).

Also, as previously described, the connection status between the contents node A, the contents node B, the contents node C, and the contents node D can be established by storing previous node address information or next node address information in the header or tail of the contents node.

In this instance, when it is determined that contents nodes more than a predetermined number are provided in a memory according to the predetermined period or information on the number of current nodes stored by the master node, a predetermined number of contents nodes starting from the lowest node can be deleted.

Figure 10:
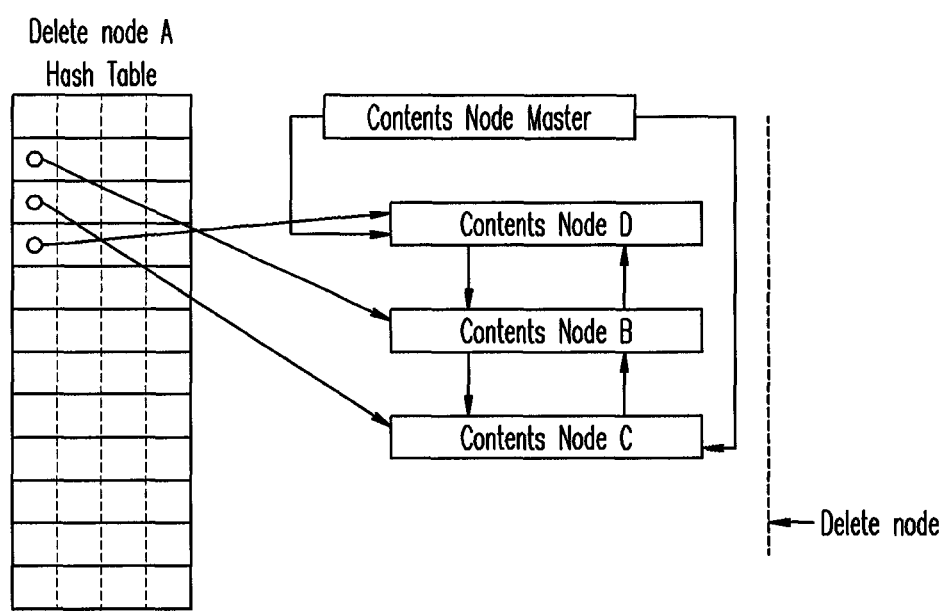

In the case of deleting two contents nodes starting from the lowest node, as shown in FIG. 10, the contents node A can be deleted through the lowest node address information stored by the master node. In this instance, contents node A address information stored in the hash table is also deleted.

Figure 11:
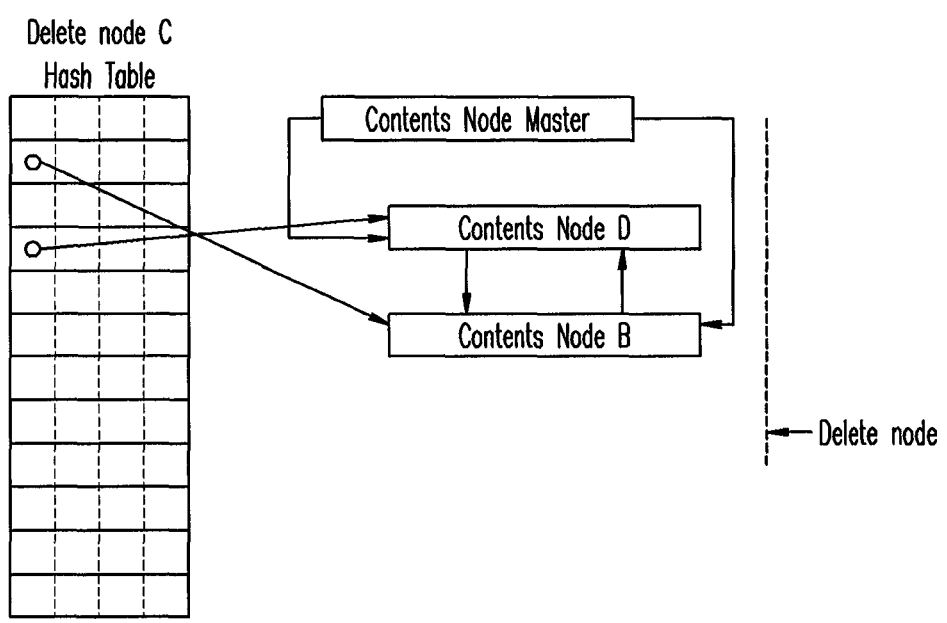

Further, as shown in FIG. 11, the contents node C is also deleted by using next node information stored by the contents node A, and the contents node C address information stored in the hash table is deleted.

The contents node B is changed to be the lowest node as a contents node next to the contents node C, and the master node can store contents node B address information as the lowest node address information.

For example, the master node maintains contents node D address information as the highest node address in the header (HEADER), and changes the lowest node address information stored in the tail (TAIL) into the address of the contents node B and stores the changed one.

The contents node B can store a null (NULL) as the lowest node in the tail (TAIL), and maintains contents node D address information which is a next node address stored in the header (HEADER). The information stored by the contents node D is maintained.

The master node and the contents nodes are generated and the same can be deleted according to a predetermined rule as described above, and the contents node for storing message information that is generated the most recently is established to be the highest node and the contents node for storing message information that is the oldest generated is established to be the lowest node so that the relation of the respective contents nodes allocated for the users is established according to the message generation order.

Since the user who sends spam messages (hereinafter, referred to as a spammer) generally is inclined to have a high trend of message transmission, the contents nodes of the spammer reside in the memory as nodes that are recently generated.

Therefore, when a predetermined number of contents nodes are deleted starting from the lowest node according to a predetermined rule by using the information stored by the master node, contents nodes of a spammer always reside as the recently generated contents nodes in the memory, and the contents nodes of the spammer are checked whether they include spam messages. Therefore, it is possible to find IDs of spammers according to the spam message filtering policy, and additionally monitor them or totally intercept them.

Hence, spammers can be efficiently found by checking a predetermined number of contents nodes starting from the highest node. In particular, the spammers to be found are not users who sent spam messages in the past but those who sent the same recently, and hence, it is acceptable to check higher contents nodes and thus find the spammers. When the master node is used in this case, the efficiency of performing the message management process for finding the spammers can be increased since the usage of the master node allows faster access to the highest node.

Also, the contents nodes storing information on old messages can be deleted in consideration of limits of system resources and information values of stored messages. In this instance, a predetermined number of contents nodes can be deleted starting from the lowest node, and when the information stored by the master node is used, the access to the lowest node becomes fast and the performance efficiency of the message management process for deleting the contents nodes can be increased.

That is, the number of contents nodes stored in the memory is reduced, and the efficiency of filtering spam messages is increased by reducing the number of contents nodes to be checked to reduce system loads and checking most of the contents nodes of the spammer.

Referring to FIG. 12 to FIG. 15, a case of applying the above-noted message management method will now be described.

Figure 12:
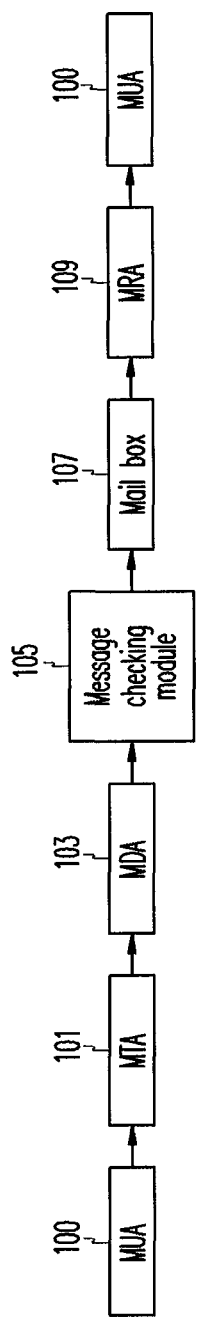
FIG. 12 to FIG. 15 show systems to which the message management method according to an embodiment of the present invention is applied.

FIG. 12 shows a message management system for checking whether a mail message sent by the user corresponds to a spam message, and the message management system includes an MUA 100, an MTA 101, an MDA 103, a message checking module 105, a mail box 107, and an MRA 109.

The MUA (Mail User Agent) 100 is a client program that is used by the user to transmit and receive electronic mail. For example, the Internet browser is generally used as the MUA 100 in the case of web mail for checking mail from a remote mail system through a protocol such as the POP or IMAP. Mail browser programs such as Outlook Express by Microsoft and Netscape Mail by Netscape can be used as the MUA 100.

The MTA (Mail Transfer Agent) 101 receives electronic mail according to the SMTP (Simple Mail Transfer Protocol) communication rule. That is, the MTA 101 receives electronic mail from another MTA 101 or the MUA 100 and transmits the same to the MTA 101 by calling the MDA (MAIL Delivery Agent) 103 or instructs the mail to be transmitted to the user's mail box 107.

The MDA 103 transmits the electronic mail received by the MTA 101 to the actual user, and transmits the same to an inner unit of the corresponding mail system or an external mail system. In this instance, an MDA 103 is provided for each channel in the case of transmitting mail to the external mail system, and the received electronic mail is stored in each user's mail box 107 of the mail system in the case of transmitting mail to the inner unit of the mail system.

The mail box 107 represents a database for storing electronic mail, and it follows the method (MBOX) for adding a file to other files and continuing the addition process, or the method for storing each electronic mail as a file in a single directory. In general, the MBOX method is used.

The MRA (Mail Retrieval Agent) 109 is a program for allowing the user access for externally checking electronic mail, and it includes a POP3 DEAMON and an IMAP4 DEAMON.

The message checking module 105, installed before the mail box 107, generates or updates a contents node for storing mail message information and checks whether mail sent by a specific user has a spam message. The message checker determines whether corresponding mail has a spam message through the title field of the mail, or checks whether the same has a spam message through mail contents as well as the title field of the mail.

The message checking module 105 filters the corresponding mail when it is determined that the corresponding message has a spam message and stores other messages in the mail box 107.

Figure 13:
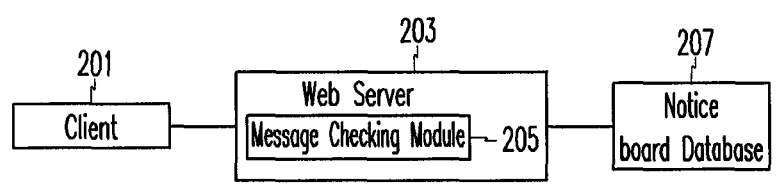

FIG. 13 shows another case for using the message management method according to an embodiment of the present invention wherein the system manages messages sent by users to register articles on a general Internet notice board and includes a web server 203 and a notice board database 207.

A user edits articles through the web page provided by the web server 203 and transmits information on the edited articles to the web server 203.

The notice board database 207 stores articles edited by the user.

In this instance, the web server 203 includes a message checking module 205 which then generates or updates message contents nodes sent by the user according to the above-described method or checks whether the articles have spam messages according to the above-described message checking method.

When the determination by the message checking module 205 finds that the article has no spam message, the article edited by the user is stored in the notice board database 207. When the article has something to be filtered, the web server 203 can reject registration of the corresponding article.

Hence, information can be efficiently acquired by checking higher contents nodes storing recently generated article messages in the case of finding the user who registers advertisement articles or acquiring current conditions on the main users of recently generated articles as marketing means according to the notice board message management policy.

Figure 14:
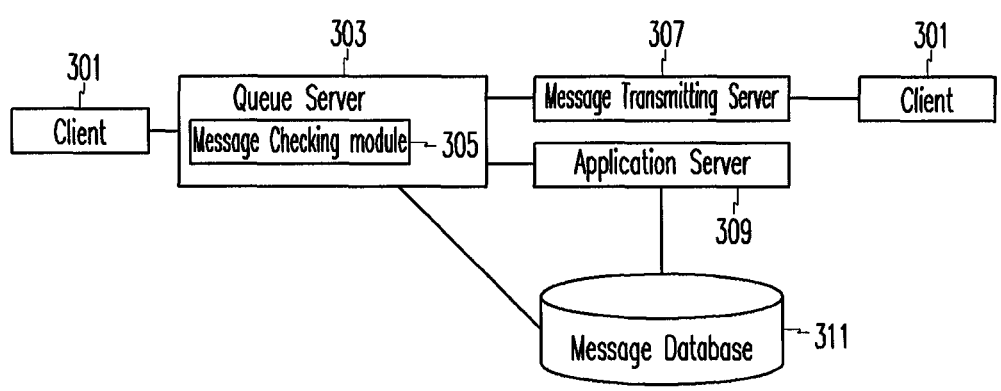

FIG. 14 shows another case of applying the message management method according to the embodiment of the present invention wherein the system manages note messages transmitted on the web from a first user to a second user and includes a queue server 303, a message transmitting server 307, an application server 309, and a message database 311.

The message database 311 stores information on the messages that are transmitted from the first user to the second user.

The application server 309 checks the user's online/offline status according to a request.

The message transmitting server 307 transmits the message transmitted by the first user to the second user.

The queue server 303 includes a message checking module 305, and it generates or updates a contents node of the note message sent by the first user according to the above-noted method and temporarily stores the note message sent by the first user and checks whether the note message is classified as a spam message according to the above-noted message checking method. Therefore, the load applied to the system because of restricted resources can be reduced, and message information can be efficiently checked and used according to the note message policy.

The queue server 303 filters the corresponding note message when it is determined to be a spam message, and transmits the note message to the second user when it is found to be a normal message.

In this instance, the queue server 303 enquires about the second user's online/offline state of the application server 309. When the second user is found to be offline, the queue server 303 stores the corresponding note message in the message database 311, and when the second user is found to be online, the queue server 303 transmits the corresponding note message to the message transmitting server so that the note message may be transmitted to the second user.

Figure 15:
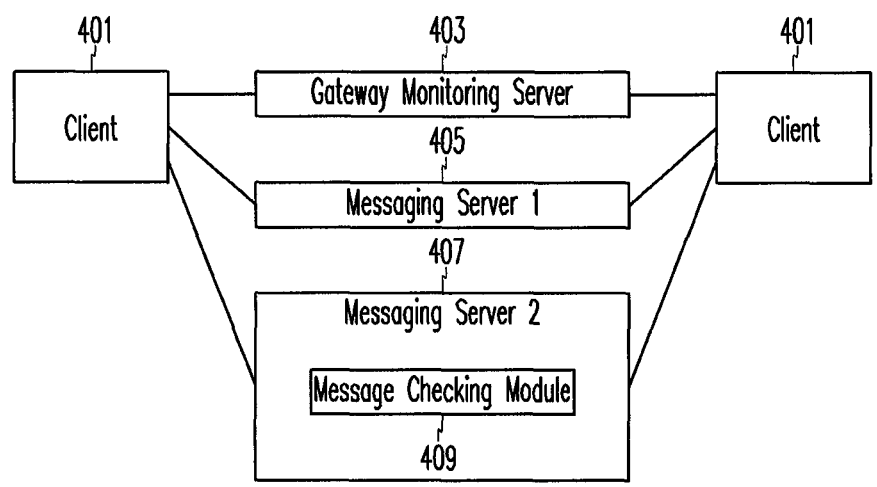

FIG. 15 shows still another case of applying the message management method according to the embodiment of the present invention wherein the system checks instant messages that are transmitted to the user through a messenger, such as MSN messenger, and includes a gateway monitoring server 403, a first messaging server 405, and a second messaging server 407.

When a user accesses the system through an instant messenger, the gateway monitoring server 403 allocates one of a plurality of first messaging servers 405, and the first messaging server 405 allocates one of a plurality of second messaging servers 407 to the user who is connected through the gateway monitoring server 403. As a result, the messenger body is connected to the first messaging server 405, and a dialog window is connected to the second messaging server 407.

The second user having received a dialog request from the first user is connected to the first messaging server 405 that is allocated through the gateway monitoring server 403, and the first messaging servers 405 can share a list of online users. Therefore, the first messaging server 405 accessed by the second user having received a dialog request transmits second messaging server information accessed by the first user to the second user's instant messenger so that the second user may access the corresponding messaging server 407.

The second messaging server 407 transmits the instant message sent by the first user to the second user, and in this instance, it includes a message checking module 409 to generate or update contents nodes on the instant message and check whether the corresponding message corresponds to a spam message.

Referring to FIG. 15, a message check module 500 according to an embodiment of the present invention will now be described in detail.

The message check module 500 includes a node setting/modifying unit 501, a timing sensor 503, a highest/lowest node checker 505, a counter 507, and a node checker 509.

The node setting/modifying unit 501 sets a master node and a contents node according to the above-noted method, updates storage information of a node that is generated when a new message is transmitted, and deletes the contents node according to a predetermined rule.

The timing sensor 503 senses a deletion period when the contents nodes stored in the memory are deleted for each predetermined period, or senses timing for eliminating contents nodes when more than a predetermined number of contents nodes are stored in the memory. In addition, the timing sensor 503 senses check timing on more than a predetermined number of contents nodes when the contents nodes are newly set or updated in the memory.

The highest/lowest node checker 505 checks address information on the contents node storing message information that is the most recently generated and address information on the contents node storing message information that is the oldest generated.

The counter 507 counts the number of contents nodes connected from the highest node or the lowest node.

On receiving a check timing signal from the timing sensor 503, the node checker 509 checks a predetermined number of contents nodes from the highest node by using information transmitted by the highest/lowest node checker 505 and the counter 507.

Also, on receiving an eliminating timing signal from the timing sensor 503, the node setting/modifying unit 501 checks a predetermined number of contents nodes from the lowest node by using information transmitted by the highest/lowest node checker 505 and the counter 507.

Figure 16:
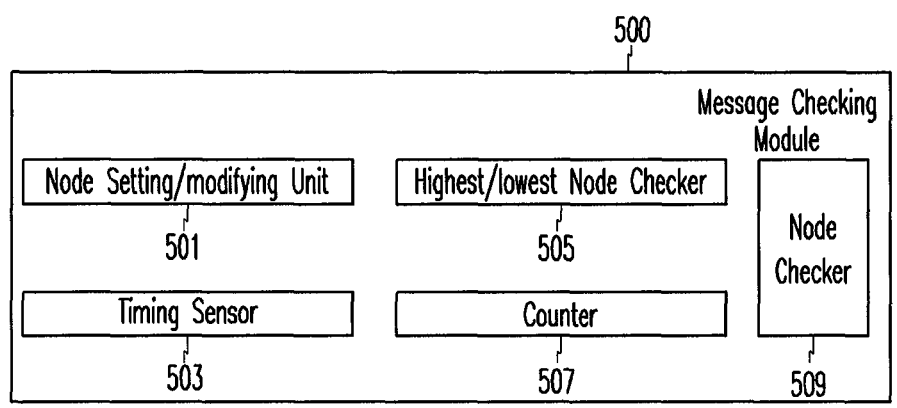
FIG. 16 to FIG. 17 show block diagrams of a message management system according to an embodiment of the present invention.
Figure 17:
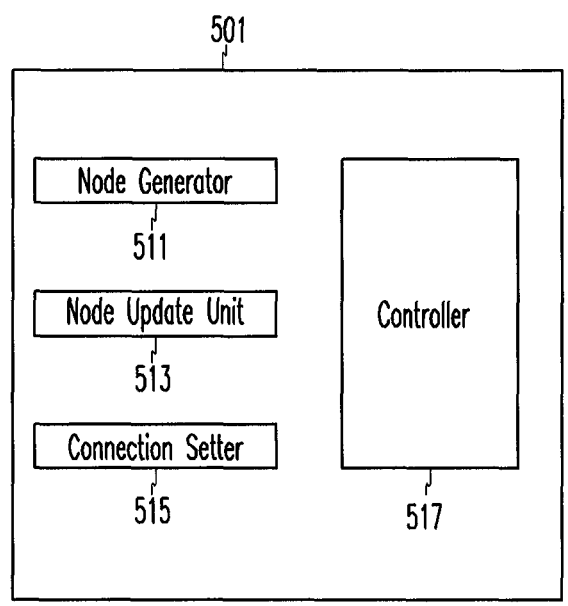

Referring to FIG. 16, the node setting/modifying unit in the message management system according to an embodiment of the present invention will now be described.

The node setting/modifying unit 501 includes a node generator 511, a node update unit 513, a connection setter 515, and a controller 517.

The node generator 511 generates a contents node for storing message information sent by the user when it receives a new message from the user and no corresponding contents node on the user is stored in the memory.

The node update unit 513 updates the existing contents nodes when it receives a new message from the user and a corresponding contents node for the user is stored in the memory. In detail, the node update unit 503 updates the number of messages sent by the user and stored in the contents node, the time when the last message is sent, and message contents.

The connection setter 515 sets connection states between contents nodes according to the messages stored by the contents nodes to thereby set a priority of nodes from the highest node to the lowest node.

The connection setter 515 stores message information that is generated the most recently, and it sets a contents node to be the highest node when a new contents node is generated or existing contents nodes are updated. The connection setter 515 resets connection states of the existing contents nodes with reference to the newly set predetermined highest node.

The controller 517 receives a message from the user to determine whether a corresponding contents node for the user exists, control a contents node to be generated and updated by the node generator 501, the node update unit 503, and a priority setter, and control to set the priority of the contents nodes from the highest node to the lowest node according to the generation time of the stored message.

While this invention has been described in connection with what is presently considered to be a practical exemplary embodiment, it is to be understood that the invention is not limited to the disclosed embodiment, but, on the contrary, is intended to cover various modifications and equivalent arrangements included within the spirit and scope of the appended claims. For example, the message check module is either included in a specific server or realized as a separate module in the above-noted system, and it is also obvious to configure various systems depending on the functions.

According to the present invention, messages can be efficiently checked or used according to the message management policy while reducing the system load.

That is, when a contents node for storing message information is allocated to a user and the user sends a new message, the existing contents node is updated to be the highest node, and the contents nodes are arranged according to the message generation time. Therefore, the efficiency message management policy can be performed based on the contents node storing the message information that is generated the most recently while saving the resources such as the memory having contents nodes.

Further, according to the present invention, messages to be filtered are efficiently found without storing or checking all the messages sent by the users in consideration of the limited memory resource and other system resources.

That is, since the spammers sending spam messages generally have high message sending rates, the contents nodes of the spammers always reside as recently generated nodes in the memory.

As a result, even when a predetermined number of contents nodes are deleted starting from the lowest node according to a predetermined rule, the spammer's contents node exists as a recently generated contents node in the memory and can be checked whether it includes a spam message. In a like manner, the spammer's contents nodes can always be checked when only a predetermined number of contents nodes are checked from the recently generated contents nodes from among the contents nodes stored in the memory.

Also, spammers who are not designated in advance can be efficiently found since the messages sent by the spammers' IDs can be separately monitored or prevented by finding the IDs according to the spam message filtering policy.

What is claimed is:

1. A method for managing message information using a processor, the method comprising:

generating a plurality of contents nodes and contents node address information corresponding to the respective contents nodes to sequentially store message information, the message information transmitted from user terminals via a data network, wherein a first contents node is generated upon transmission of a first message from a first user terminal and a second contents node is generated upon transmission of a second message from a second user terminal;

setting, by the processor, a priority of the contents nodes according to the highest node and the lowest node based on a sequence of time of the sequentially stored message information, wherein the first contents node being as a next contents node stores a second contents node address information and the second contents node being as a previous contents node stores a first contents node address information;

upon receiving a new message from the first user terminal, updating the contents node by resetting previous contents nodes and next contents nodes with respect to the first contents node and the second contents node to make the first contents node a higher node than the second contents node; and deleting contents nodes starting from the lowest node, wherein non-deleted contents nodes are determined whether to be filtered.

2. A method for managing message information using a processor, the method comprising:

generating a plurality of contents nodes and contents nodes address information to store message information transmitted from user terminals via a network based on a sequence of time, wherein the contents node are generated based on a priority from the recently generated information to the earliest generated information, wherein a first contents node is generated upon transmission of message information corresponding to a first user and a second contents node is generated upon transmission of message information corresponding to a second user terminal;

prioritizing, by the processor, the contents node according to the sequence of time of receiving the message information by setting the message information from the highest generated contents node to the lowest generated contents node according to the priority, wherein the first contents node being as a next contents node stores a second contents node address information and a second contents node being as a previous contents node stores a first contents node address information, the message information corresponding to the first user is transmitted more recently than the message information corresponding to the second user terminal;

upon receiving a new contents node from the first user, reallocating previous contents nodes and the next contents nodes with respect to the first contents node and the second contents node by setting the first content node higher node than the second content node; and determining the highest contents node whether to be filtered.

3. The message management method of claim 1 or claim 2, wherein the contents node comprises at least one information associated with a number of messages transmitted by users, a time when a user sent the last message, actual message contents, a previous contents node address, a next contents node address or any combination thereof.

4. The message management method of claim 1 or claim 2, wherein setting a priority of the contents nodes comprises setting a first contents node for a first user in response to receiving a message from the first user, setting a second contents node for a second user in response to receiving a message from the second user, and changing the firstly received contents node as the lowest generated contents node to store secondly received contents node address information as the highest generated contents node, and, upon receiving a third contents node, changing the secondly received contents node as the lowest contents node to store thirdly received contents node address information as the highest generated contents node, wherein the firstly generated contents node is deleted.

5. The message management method of claim 4, further comprising:

reallocating one of the previous nodes or the next nodes of the firstly received contents node and the secondly received contents node to make the firstly received contents node as a node that is higher than the secondly received contents node in response to detection of receiving another message from the first user.

6. The message management method of claim 1 or claim 2, further comprising:

storing message sender identification (ID) information corresponding to the message information; and determining whether the sender is a spammer according to a rule in response to detection of the message information being filtered from the message information that is the most recently generated or the earliest generated.

7. The message management method of claim 1 or claim 2, further comprising:

generating a hash table to store the contents node address information corresponding to the respective contents node associated with message information transmitted to and from the user terminals, wherein the hash table is configured to store the contents node address information of the corresponding contents node comprising a user identification (ID) as an input value.

8. The message management method of claim 1 or claim 2, further comprising:

providing a master node to store at least one of the highest contents node address information, the lowest contents node address information, or the total number of the contents node address information based on a number of currently received contents nodes, and determining the highest node information or the lowest node information by checking the contents node address information stored in the master node.

9. The message management method of claim 8, wherein an address of the master node is a static address that is fixed at an initially allocated value.

10. The message management method of claim 1, wherein the contents nodes are deleted according to a rule including a period of time indicating when to start and finish the deletion or a number of contents nodes received.

11. The message management method of claim 1, further comprising:

updating message information comprising checking a number of contents nodes starting from the highest contents node and checking whether the received messages are filtered.

12. The message management method of claim 1 or claim 2, wherein the highest node and the lowest node respectively correspond to a contents node to store the most recently generated message information and a contents node to store the earliest generated message information.

13. The message management method of claim 2, further comprising:

deleting a number of contents nodes starting from the lowest generated contents node.

14. A non-transitory computer-readable recording medium storing an executable program, which when executed, performs the method comprising:

generating a plurality of contents nodes and contents node address information corresponding to the respective contents nodes to sequentially store message information, the message information transmitted from user terminals via a data network, wherein a first contents node is generated upon transmission of a first message from a first user terminal and a second contents node is generated upon transmission of a second message from a second user terminal;

setting, by the processor, a priority of the contents nodes according to the highest node and the lowest node based on a sequence of time of the sequentially stored message information, wherein the first contents node being as a next contents node stores a second contents node address information and the second contents node being as a previous contents node stores a first contents node address information;

upon receiving a new message from the first user terminal, updating the contents node by resetting previous contents nodes and next contents nodes with respect to the first contents node and the second contents node to make the first contents node a higher node than the second contents node; and deleting contents nodes starting from the lowest node, wherein non-deleted contents nodes are determined whether to be filtered.

15. A non-transitory computer-readable recording medium storing an executable program, which when executed, performs the method comprising:

generating a plurality of contents nodes and contents nodes address information to store message information transmitted from user terminals via a network based on a sequence of time, wherein the contents node are generated based on a priority from the recently generated information to the earliest generated information, wherein a first contents node is generated upon transmission of message information corresponding to a first user and a second contents node is generated upon transmission of message information corresponding to a second user terminal;

prioritizing, by the processor, the contents node according to the sequence of time of receiving the message information by setting the message information from the highest generated contents node to the lowest generated contents node according to the priority, wherein the first contents node being as a next contents node stores a second contents node address information and a second contents node being as a previous contents node stores a first contents node address information, the message information corresponding to the first user is transmitted more recently than the message information corresponding to the second user terminal;

upon receiving a new contents node from the first user, reallocating previous contents nodes and the next contents nodes with respect to the first contents node and the second contents node by setting the first content node higher node than the second content node; and determining the highest contents node whether to be filtered.

16. A non-transitory computer-readable recording medium storing an executable program, which when executed, performs the method comprising:

generating a plurality of contents nodes and contents node address information corresponding to the respective contents nodes to sequentially store message information, the message information transmitted from user terminals via a data network, wherein a first contents node is generated upon transmission of a first message from a first user terminal and a second contents node is generated upon transmission of a second message from a second user terminal;

setting, by the processor, a priority of the contents nodes according to the highest node and the lowest node based on a sequence of time of the sequentially stored message information, wherein the first contents node being as a next contents node stores a second contents node address information and the second contents node being as a previous contents node stores a first contents node address information;

upon receiving a new message from the first user terminal, updating the contents node by resetting previous contents nodes and next contents nodes with respect to the first contents node and the second contents node to make the first contents node a higher node than the second contents node; and deleting contents nodes starting from the lowest node, wherein non-deleted contents nodes are determined whether to be filtered;

wherein the contents nodes are deleted according to a rule including a period of time indicating when to start and finish the deletion or a number of contents nodes received.

17. A non-transitory computer-readable recording medium storing an executable program, which when executed, performs the method comprising:

generating a plurality of contents nodes and contents nodes address information to store message information transmitted from user terminals via a network based on a sequence of time, wherein the contents nodes are generated based on a priority from the recently generated information to the earliest generated information, wherein a first contents node is generated upon transmission of message information corresponding to a first user and a second contents node is generated upon transmission of message information corresponding to a second user terminal;

prioritizing, by the processor, the contents node according to the sequence of time of receiving the message information by setting the message information from the highest generated contents node to the lowest generated contents node according to the priority, wherein the first contents node being as a next contents node stores a second contents node address information and a second contents node being as a previous contents node stores a first contents node address information, the message information corresponding to the first user is transmitted more recently than the message information corresponding to the second user terminal;

upon receiving a new contents node from the first user) reallocating previous contents nodes and the next contents nodes with respect to the first contents node and the second contents node by setting the first content node higher node than the second content node;

determining the highest contents node whether to be filtered; and deleting a number of contents nodes starting from the lowest generated contents node.

* * * * *

UNITED STATES PATENT AND TRADEMARK OFFICE
CERTIFICATE OF CORRECTION

| | | |
|---|---|---|
| PATENT NO. | : 8,874,646 B2 | Page 1 of 1 |
| APPLICATION NO. | : 11/817055 | |
| DATED | : October 28, 2014 | |
| INVENTOR(S) | : Choi | |

It is certified that error appears in the above-identified patent and that said Letters Patent is hereby corrected as shown below:

On the Title Page:

Under *Item (30) Foreign Application Priority Data*, delete the following reference:

"Feb. 28, 2006   (WO)…PCT/KR2006/000703".

Signed and Sealed this
First Day of December, 2015

Michelle K. Lee
*Director of the United States Patent and Trademark Office*